May 16, 1950
F. M. SMITH
2,507,765
PRODUCTION OF ALKYL BENZENES
Filed June 9, 1947
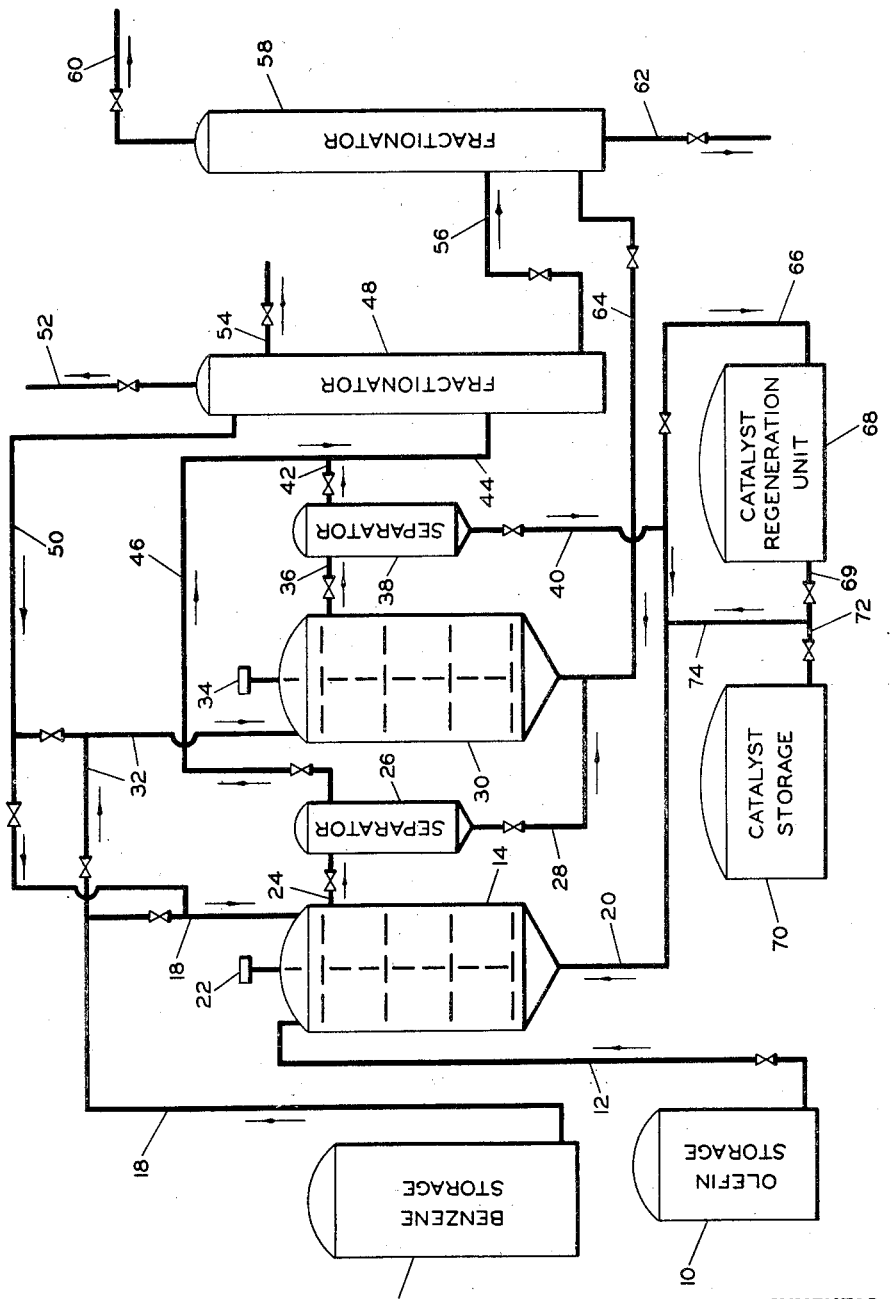
INVENTOR.
F. M. SMITH
BY
*Hudson and Young*
ATTORNEYS Patented May 16, 1950

2,507,765

UNITED STATES PATENT OFFICE 2,507,765

PRODUCTION OF ALKYL BENZENES

Fredrick M. Smith, Bartlesville, Okla., assignor to Phillips Petroleum Company, a corporation of Delaware Application June 9, 1947, Serial No. 753,561

7 Claims. (Cl. 260—671)

This invention relates to a process for the production of high molecular weight alkyl aromatic hydrocarbons. One embodiment of it relates to an improved process for the alkylation of aromatic hydrocarbons with high molecular weight olefins in the presence of liquid type catalysts. In one specific embodiment this invention relates to a two-step process for the alkylation of benzene in the presence of liquid type catalysts wherein high molecular weight straight- and branched-chain olefins serve as alkylating agents for a portion of said benzene, the remainder being alkylated in a second step wherein catalyst soluble products produced in the first step serve as alkylating agents.

According to one prior disclosure, benzene hydrocarbons can be alkylated with high molecular weight straight- and branched-chain olefins contained in a catalytically cracked naphtha. According to that disclosure, the benzene hydrocarbons and the olefin-containing material are agitated with a liquid type catalyst such as hydrofluoric acid, boron fluoride compositions, and the like, under conditions for condensation of olefins with the benzene hydrocarbons to produce alkyl benzenes boiling in the range 500 to 700° F. suitable for use as detergent intermediates. The alkylation effluent is passed to a separating chamber where it is divided into catalyst and hydrocarbon phases by gravity, the heavier catalyst phase being returned to the alkylation zone and the hydrocarbon phase discharged for fractionation.

While this method of operation has numerous advantages, difficulties are encountered in the process as a result of the formation of catalyst soluble products which remain in the catalyst phase. These catalyst soluble products apparently result largely from the polymerization of olefins, a reaction which is activated by the alkylation catalyst. The olefin polymers combine with the catalyst to form compositions or complexes in which other hydrocarbons, including olefins, alkyl benzenes, and unalkylated aromatics, are soluble. The extent of formation of these products is often very large, their volume sometimes exceeding that of useful alkylate produced. Thus a large amount of hydrocarbon otherwise utilizable in the alkylation builds up in the catalyst phase and must be removed from the system continuously to prevent excessive catalyst dilution.

I have now discovered a process for the production of alkyl benzenes from benzene hydrocarbons and high molecular weight straight- and branched-chain olefins in the presence of liquid-type catalysts wherein losses from the formation of catalyst soluble products are eliminated or substantially reduced. According to the method of my invention a portion of the benzene hydrocarbon is fed to a reactor in which alkylation is effected by the use of an alkylation reactant comprising high molecular weight olefins, which may be an olefin concentrate. Another portion of the benzene hydrocarbon feed is directed to a second reactor where it is admixed with catalyst phase, which comprises catalyst and catalyst soluble oil separated from the effluent from the first step. With conditions in the second reactor at substantially the same level as in the first and in the presence of the aromatic feed stock, transfer of alkyl groups from complex aromatic hydrocarbons to the benzene, together with substantial depolymerization of the olefine polymers in the acid soluble products takes place, releasing constituent olefins together with olefins and other hydrocarbons dissolved therein, thus furnishing an alkylating agent for the benzene hydrocarbons fed to the said reactor. The effluent from the second step is separated into catalyst and hydrocarbon phases, the catalyst phase, now containing but little catalyst soluble product, is returned to the first step and the hydrocarbon phase combined with that from the first step for fractionation.

One object of this invention is to provide an improved process for the production of alkyl aromatics.

Another object of this invention is to provide an improved process for the production of alkyl benzenes suitable for use as detergent intermediates.

Still another object is to provide a two-step process for the alkylation of benzene hydrocarbons with high molecular weight olefins in the presence of liquid type catalysts.

A specific object of this invention is to provide an improved two-step catalytic process for alkylating benzene with olefins containing at least seven and not more than eighteen carbon atoms to the molecule.

Other objects and advantages of this invention will be apparent to those skilled in the art from the accompanying discussion and description.

According to the method of my invention the hydrocarbons comprised in the catalyst soluble products which have heretofore been removed as low-grade by-products are utilized to provide high yields of desirable alkylate. Olefins released by depolymerization of the polymers combined with the catalyst together with olefins previously dissolved in the catalyst-polymer composition are employed as alkylating reactants for the benzene hydrocarbons fed to the process. Any alkyl benzenes from the first alkylation step which may have been constituents of the catalyst-hydrocarbon composition are released and made available as product. In some instances such dissolved alkyl benzenes, being in intimate contact with olefinic material and with the catalyst, are further alkylated to form high boiling polyalkyl benzenes which have little value as product. However, in the presence of an excess of the benzene hydrocarbon employed, such products tend to undergo dealkylation and side chain transfer with unalkylated benzene hydrocarbons thus being transformed into useful alkylate.

These and other advantages of the present process will be apparent from an explanation of the accompanying drawing in which is shown a diagrammatic illustration of one specific embodiment of the invention. Specific feed stocks and catalyst are mentioned in the description, not as limiting the scope of the disclosure but as an aid to clarity in explanation. Referring to the drawing, an olefin concentrate comprising high molecular weight straight- and branched-chain olefins of at least seven and not more than eighteen carbon atoms to the molecule, obtained by fractionating a catalytically cracked naphtha to produce a cut boiling between 200 and 600° F. is drawn from storage 10 through line 12 and introduced into alkylation zone 14. Here the olefin concentrate is admixed with a molar excess of benzene drawn from storage 16 through line 18 and a catalyst comprising hydrofluoric acid introduced through line 20. Contacting of the catalyst and the reactants is effected by stirrer 22. Conditions in alkylation zone 14 are maintained at a level suitable for a high degree of conversion of olefins from the feed stock to alkyl benzenes. Effluent is discharged from alkylation zone 14 through line 24 to separator 26 where it is divided by gravity into catalyst and hydrocarbon phases. The heavier catalyst phase, comprising a composition of the catalyst with olefin polymers and other hydrocarbons, is removed from the separator through line 28 and introduced into alkylation zone 30 where it is mixed with an excess of benzene from line 32. Effective contacting is effected by stirrer 34, while conditions are maintained for transfer of alkyl groups, and for depolymerization of olefin polymers, from the catalyst soluble products and a high degree of utilization of the olefins so obtained together with any olefins previously dissolved in the catalyst-polymer composition as alkylating reactants for benzene.

Effluent from alkylation zone 30 is discharged through line 36 to separator 38 where it is separated gravitationally into catalyst and hydrocarbon phases. The heavier catalyst phase, now containing but little catalyst soluble product, is recycled to the first alkylation zone through line 40. The hydrocarbon phase is removed through line 42 to line 44 where it is combined with hydrocarbon phase conveyed from the separator 26 through line 46. From line 44 the total hydrocarbon phase enters fractionator 48 from which unreacted benzene is removed through line 50 for recycling to the alkylation zones. If desired, at least a portion of the unreacted benzene and lighter material, if any, may be removed from the system through line 52. Hydrocarbons previously associated with the olefins in the olefin concentrate employed as alkylating agent in the first step are removed through line 54 for storage or utilization elsewhere. Higher boiling effluent from this fractionator comprising crude alkyl benzenes is passed through line 56 to fractionator 58 which will preferably be operated under reduced pressure, where monoalkyl benzenes are removed through line 60 and high boiling bottoms may be discharged from the system through line 62 or recycled through line 64 to alkylation zone 30. Since these high boiling bottoms products comprise largely polyalkyl benzenes it may be advantageous, in some instances, to recycle them to alkylation zone 30 where sidechain transfer with the benzene and depolymerization of heavy olefins may be effected thereby converting them to desirable product.

Catalyst activity is maintained at a high level by drawing off portions of the used catalyst in line 40 through line 66 and passing it to catalyst regeneration unit 68. The regenerated catalyst flows through line 69 together with such makeup as needed, drawn from storage 70 through line 72, is returned to the system through line 74.

In the accompanying diagrammatic drawing reference to some of the equipment such as pumps, gauges, and other equipment which obviously would be necessary to actually operate the process have been intentionally omitted. Only sufficient equipment has been shown to illustrate the process of the invention and it is intended that no undue limitation be read into this invention by reference to the drawing and discussion thereof.

The olefins to be employed in the process of my invention contain at least seven and not more than 18 carbon atoms and may, when desired, be comprised in a concentrate produced by selecting a fraction boiling between 200 and 500° F. from a catalytically cracked naphtha. A suitable source of such a cracked naphtha may be found in the products of a "Cycloversion" process wherein a high boiling naphtha or gas oil is combined with high temperature steam diluent and passed over controlled temperature fixed bed catalysts. Such a process is more fully discussed in an article by Schulze in "Oil and Gas Journal," April 13, 1944. Any other suitable source for the olefins or olefin concentrates is applicable to the present process.

The process of my invention is applicable to the alkylation of benzene, toluene, xylene, and the like, and is particularly applicable to the alkylation of benzene with high molecular weight olefins. In some instances, highly aromatic naphtha fractions such as may be obtained from thermally cracked naphthas may be employed as a source of alkylatable aromatic hydrocarbons to an advantage.

The catalyst to be employed in the process of my invention is a liquid type, preferably hydrofluoric acid in concentrations of 50 per cent or higher. Anhydrous hydrogen fluoride, boron fluoride complexes or compositions with water, phosphoric acid, hydrofluoric acid, and the like are also applicable.

Conditions in the alkylation zones will vary somewhat depending upon the catalyst employed but will generally be at a temperature between about 60 and about 140° F. with pressure sufficient to prevent vaporization of the catalyst. For example, a pressure between 25 and 50 pounds per square inch gauge is sufficient. Flow rates of reactants should be maintained such that a residence time between 5 and 60 minutes will be provided in the alkylation zones, and preferably between 15 and 45 minutes. The mol ratio of aromatic to olefin entering the alkylation zone should be between 5:1 and 10:1, preferably between 6:1 and 8:1. The ratio of catalyst used to total hydrocarbons in reaction zone should be in the range of about 1:5 to 2:1, but preferably about 1:3 to 1:1.

*Example*

A benzene-olefin blend was prepared by mixing 15.3 pounds of an olefin concentrate containing 2.6 pounds of olefin with benzene in a ratio of one mol of olefin to nine mols of benzene. This blend was introduced into a reactor with an equal volume of hydrogen fluoride catalyst and stirred at a temperature of 90° F. for 33 minutes under a pressure of 30 pounds per square inch gauge. Effluent from the reactor was seperated into catalyst and hydrocarbon phases by gravity. Fractionation of the hydrocarbon phase yielded 1.1 pounds of alkyl benzenes boiling in the range 500 to 700° F. and 1.0 pound of higher boiling material.

The catalyst phase, weighing 6.5 pounds and comprising catalyst and catalyst soluble products was mixed with 2.2 pounds of benzene in a second reactor. The mixture was stirred for 30 minutes at a temperature of 90° F. and under a pressure of 30 pounds per square inch gauge. The effluent was separated into catalyst and hydrocarbon phases as before. Fractionation of the hydrocarbon phase yielded 0.8 pound of alkyl benzenes boiling in the range 500 to 700° F. Tests on the catalyst phases from the first and second reactors showed acid strengths of 81 per cent and 89 per cent, respectively.

According to the above run the utilization of catalyst soluble products from the first alkylation step as alkylating agents for benzene in a second step increased the yield of desirable alkylate by more than 70 per cent and at the same time increased the acid strength of the catalyst appreciably.

It is to be understood that this invention should not be unnecessarily limited to the above discussion and description and that modifications and variations may be made without departing substantially from the invention or from the scope of the claims.

I claim:

1. A two-step process for catalytically producing high molecular weight alkyl benzenes, which comprises mixing alkylatable benzene hydrocarbon and olefin-bearing material containing olefins having at least seven and not more than eighteen carbon atoms per molecule with a liquid type alkylation catalyst in an alkylation zone; maintaining the temperature in said alkylation zone in a range of 60 to 140° F.; maintaining the pressure in said alkylation zone sufficient to prevent vaporization of said alkylation catalyst; maintaining a rate of feed of said olefin-bearing material and said benzene hydrocarbon such that the residence time in said alkylation zone is in the range of about 5 to about 60 minutes; maintaining mol ratio of said benzene hydrocarbon to olefin entering said alkylation zone in a range of about 5:1 to 10:1; allowing effluent from said alkylation zone to separate by gravity into a catalyst phase containing a substantial quantity of polymers of said olefins having at least 7 and not more than 18 carbon atoms per molecule and a hydrocarbon phase in a separation zone; mixing said resulting catalyst phase with an excess of benzene hydrocarbons and in the absence of any other added reactive material in a second alkylation zone; maintaining the temperature in said second alkylation zone in a range of 60 to 140° F., maintaining the rate of feed of said catalyst phase and said benzene hydrocarbon such that residence time in said second alkylation zone is in range of about 5 to about 60 minutes to cause depolymerization of said polymers and alkylation of the benzene thereby; allowing effluent from said second alkylation zone to separate by gravity into catalyst phase and hydrocarbon phase in a second separation zone and recycling said resulting catalyst phase to said first alkylation zone; introducing said hydrocarbon phases from both said separation zones into a fractionation zone; removing from said fractionation zone unreacted alkylatable benzene hydrocarbons from said hydrocarbon phase and recycling said unreacted benzene hydrocarbons to at least one of said alkylation zones, removing intermediate hydrocarbons associated with the original olefin-bearing material, and recovering alkyl benzenes as a product of the process from higher-boiling hydrocarbon material, and recycling resulting higher-boiling material to said second alkylation zone.

2. A two-step process for catalytically producing high molecular weight alkyl benzenes, which comprises mixing benzene and olefin-bearing material containing olefins having at least seven and not more than eighteen carbon atoms per molecule with a liquid type alkylation catalyst selected from the group consisting of anhydrous hydrogen fluoride, hydrofluoric acid of concentration of at least 50 per cent, and boron fluoride complexes in an alkylation zone; maintaining the temperature in said alkylation zone in a range of about 60 to about 140° F.; maintaining the pressure in said alkylation zone sufficient to prevent vaporization of said alkylation catalyst; maintaining the rate of feed of said olefin-bearing material and said benzene such that the residence time in said alkylation zone is in the range of about 5 to about 60 minutes, maintaining a mol ratio of said benzene to olefin entering said alkylation zone in range of about 5:1 to 10:1; allowing effluent from said alkylation zone to separate by gravity into a catalyst phase containing a substantial quantity of polymers of said olefins having at least 7 and not more than 18 carbon atoms per molecule and a hydrocarbon phase in a separation zone; mixing said resulting catalyst phase with an excess of benzene and in the absence of any other reactive material in a second alkylation zone, maintaining the temperature in said second alkylation zone in range of about 60 to about 140° F., maintaining the rate of feed of said catalyst phase and said benzene such that residence time in said second alkylation zone is in a range of about 5 to about 60 minutes to cause depolymerization of said polymers and alkylation of the benzene thereby, allowing effluent from said second alkylation zone to separate by gravity into catalyst phase and hydrocarbon phase in a separation zone and recycling said catalyst phase to the first alkylation zone; introducing said hydrocarbon phases from both said separation zones into a fractionation zone; removing from said fractionation zone unreacted benzene from said hydrocarbon phase and recycling said unreacted benzene to at least one of said alkylation zones, removing intermediate hydrocarbons associated with the original olefin-bearing material, and recovering alkyl benzenes as a product of the process from higher-boiling hydrocarbon material, and recycling resulting higher-boiling material to said second alkylation zone.

3. A process for catalytically producing high molecular weight alkyl benzenes, which comprises mixing benzene and olefin-bearing material having a boiling range of 200 to 600° F. and obtained from a cracked naphtha with a liquid type alkylation catalyst selected from the group consisting of anhydrous hydrogen fluoride, hydrofluoric acid of concentration of at least 50 per cent, and boron fluoride complexes in an alkylation zone; maintaining the temperature in said alkylation zone in the range of about 60 to about 140° F.; maintaining the pressure in said alkylation zone sufficient to prevent vaporization of said alkylation catalyst; maintaining a rate of feed of said olefin-bearing material and said benzene such that the residence time in said alkylation zone is in the range of about 5 to about 60 minutes, maintaining a mol ratio of said benzene to olefin entering said alkylation zone in the range of about 5:1 to 10:1; allowing effluent from said alkylation zone to separate by gravity into a catalyst phase containing a substantial quantity of polymers of said olefins having at least 7 and not more than 18 carbon atoms per molecule and a hydrocarbon phase in a separation zone; mixing said catalyst phase with an excess of benzene in a second alkylation zone, maintaining the temperature in said second alkylation zone in range of about 60 to about 140° F., maintaining a rate of feed of said catalyst phase and said benzene such that residence time in said second alkylation zone is in range of about 5 to about 60 minutes to cause depolymerization of said polymers and alkylation of the benzene thereby, allowing effluent from said second alkylation zone to separate by gravity into a catalyst phase and a hydrocarbon phase in a separation zone and recycling said catalyst phase to the first alkylation zone; introducing said hydrocarbon phases from both said separation zones into a fractionation zone; removing from said fractionation zone unreacted benzene from said hydrocarbon phase and recycling said unreacted benzene to at least one of said alkylation zones, removing intermediate hydrocarbons associated with the original olefin-bearing material, and removing alkyl benzenes as a product of the process from higher-boiling hydrocarbon material, and recycling resulting higher-boiling material to said second alkylation zone.

4. A two-step process for catalytically producing high molecular weight alkyl benzenes, which comprises mixing benzene and olefin-bearing material having a boiling range between 200 and 600° F. and obtained by catalytically cracking a naphtha in presence of steam and at a temperature in the range of about 975 to 1050° F. and at a pressure of about 75 to 100 pounds per square inch gauge while passing same over a fixed bed catalyst with a liquid type alkylation catalyst in an alkylation zone; maintaining the temperature in said alkylation zone in a range of about 60 to about 140° F.; maintaining the pressure in said alkylation zone sufficient to prevent vaporization of said alkylation catalyst; maintaining the rate of feed of said olefin-bearing material and said benzene such that the residence time in said alkylation zone is in the range of about 5 to about 60 minutes, maintaining a mol ratio of said benzene to olefin entering said alkylation zone in the range of about 5:1 to 10:1; allowing effluent from said alkylation zone to separate by gravity into a catalyst phase containing a substantial quantity of polymers of said olefins having at least 7 and not more than 18 carbon atoms per molecule and a hydrocarbon phase in a separation zone; mixing said catalyst phase with an excess of benzene in a second alkylation zone, maintaining temperature in said second alkylation zone in the range of about 60 to about 140° F., maintaining the rate of feed of said catalyst phase and said benzene such that the residence time in said second alkylation zone is in the range of about 5 to about 60 minutes to cause depolymerization of said polymers and alkylation of the benzene thereby, allowing effluent from said second alkylation zone to separate by gravity into catalyst phase and hydrocarbon phase in a separation zone and recycling said catalyst phase to the first alkylation zone; introducing said hydrocarbon phases from both said separation zones into a fractionation zone; removing from said fractionation zone unreacted benzene from said hydrocarbon phase and recycling said unreacted benzene to at least one of said alkylation zones, removing intermediate hydrocarbons associated with the original olefin-bearing material, and removing alkyl benzenes as a product of the process from higher-boiling hydrocarbon material, and recycling resulting higher-boiling material to said second alkylation zone.

5. A process as in claim 4 where the catalyst is anhydrous hydrogen fluoride.

6. A process as in claim 4 where the catalyst is hydrofluoric acid in concentrations of at least 50 per cent.

7. A process as in claim 4 wherein the catalyst is a boron fluoride complex.

FREDRICK M. SMITH.

REFERENCES CITED

The following references are of record in the file of this patent:

UNITED STATES PATENTS

| Number | Name | Date |
| --- | --- | --- |
| 2,349,211 | Tulleners | May 16, 1944 |
| 2,373,580 | Linn | Apr. 10, 1945 |
| 2,376,119 | Bruner et al. | May 15, 1945 |
| 2,394,905 | Frey | Feb. 12, 1946 |
| 2,403,879 | Schulze et al. | July 9, 1946 |
| 2,404,340 | Zimmerman | July 16, 1946 |
| 2,420,073 | Frey | May 6, 1947 |